: US008630840B1

(12) United States Patent
Smith

(10) Patent No.: US 8,630,840 B1
(45) Date of Patent: Jan. 14, 2014

(54) SYSTEMS AND METHODS FOR COMMUNICATION WITH FOREIGN LANGUAGE SPEAKERS

(75) Inventor: Dena Louise Smith, Tampa, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 1197 days.

(21) Appl. No.: 11/853,515

(22) Filed: Sep. 11, 2007

(51) Int. Cl.
*G06F 17/20* (2006.01)

(52) U.S. Cl.
USPC ............. 704/8; 379/88.05; 379/189; 370/260

(58) Field of Classification Search
USPC .................................................. 704/277, 270
See application file for complete search history.

(56) References Cited

U.S. PATENT DOCUMENTS

| | | | | |
|---|---|---|---|---|
| 6,937,868 | B2* | 8/2005 | Himmel et al. ............. | 455/456.4 |
| 8,010,338 | B2* | 8/2011 | Thorn ............................... | 704/8 |
| 2002/0021791 | A1* | 2/2002 | Heilmann et al. ........... | 379/189 |
| 2002/0055351 | A1* | 5/2002 | Elsey et al. .................... | 455/414 |
| 2003/0028380 | A1* | 2/2003 | Freeland et al. .............. | 704/260 |
| 2003/0035412 | A1* | 2/2003 | Wang et al. .................... | 370/352 |
| 2003/0039340 | A1* | 2/2003 | Deshpande et al. ........ | 379/88.16 |
| 2003/0125927 | A1* | 7/2003 | Seme ................................ | 704/3 |
| 2003/0134626 | A1* | 7/2003 | Himmel et al. ................ | 455/419 |
| 2004/0158471 | A1* | 8/2004 | Davis et al. ................... | 704/277 |
| 2005/0021344 | A1* | 1/2005 | Davis et al. ................... | 704/277 |
| 2005/0058270 | A1* | 3/2005 | Allen et al. .............. | 379/220.01 |
| 2005/0266863 | A1* | 12/2005 | Benco et al. ................. | 455/466 |
| 2006/0133585 | A1* | 6/2006 | Daigle et al. ............... | 379/88.06 |
| 2007/0025529 | A1* | 2/2007 | Romeo ....................... | 379/88.14 |
| 2007/0133437 | A1* | 6/2007 | Wengrovitz et al. .......... | 370/260 |
| 2007/0150286 | A1* | 6/2007 | Miller et al. ................ | 704/270.1 |
| 2008/0126077 | A1* | 5/2008 | Thorn ............................... | 704/8 |

OTHER PUBLICATIONS

Danet, Brenda and Herring, Susan C.; "Introduction: The Multilingual Internet"; Journal of Computer-Mediated Communication; Nov. 2003; pp. 1-9; vol. 9, No. 1; http://jcmc.indiana.edu/vol9/issue1/intro.html.

Danet, Brenda and Herring, Susan C.; "Multilingualism on the Internet"; The Multilingual Internet Language, Culture and Communication Online; pp. 1-10; Hebrew University of Jerusalem, Yale University, Indiana University.

Thorne, Steven L. and Payne, J. Scott; "Evolutionary Trajectories, Internetmediated Expression, and Language Education"; CALICO Journal, 2005; pp. 371-397; vol. 22 No. 3; The Pennsylvania State University.

(Continued)

*Primary Examiner* — Douglas C Godbold
*Assistant Examiner* — Mark Villena
(74) *Attorney, Agent, or Firm* — Brooks, Cameron & Huebsch, PLLC

(57) ABSTRACT

Instant messaging (IM) is provided and translated between parties that speak different languages, such as between a foreign language speaker and an entity. One or more converters may convert the foreign language speaker's speech to IM text in the speaker's language, which may then be translated into a language used by the entity. The foreign language speaker may provide IM text instead of speaking, and this IM text in the foreign language may be translated into IM text in a language used by the entity. The translated IM text or the speech converted from the translated IM text may then be provided as text, or may be converted to speech and provided as speech, to the entity, or a representative associated with the entity.

14 Claims, 7 Drawing Sheets

(56) References Cited

OTHER PUBLICATIONS

Eisenstadt, Marc, Komzak, Jirl and Cerri, Stefano A.; "Peer Conversations for e-Learning in the Grid"; 1st International ELeGI Conference on Advanced Technology for Enhanced Learning; 2005; pp. 1-8; British Computer Society; http://www.bcs.org/server.php?show=ConWebDoc.3843.

Turban, Efraim, Leidner, Dorothy, McLean, Ephraim, and Wetherbe, James; "Chapter 3 Network Computing: Discovery, Communication, and Collaboration"; Information Technology for Management: Transforming Organizations in the Digital Economy, 5th Edition; 2006; pp. 89-136.

* cited by examiner

SYSTEMS AND METHODS FOR COMMUNICATION WITH FOREIGN LANGUAGE SPEAKERS

BACKGROUND

Currently, a foreign language speaker communicates by phone with a representative of an entity, such as a financial services company, through a third party interpreter, if the speaker and the representative do not speak the same language. This process requires the third party to translate languages and relay information between the foreign language speaker and the representative. This leads to increased cost and phone call times, and often leads to confusion for the foreign language speaker and the representative. Additionally, the foreign language speaker may be unaware of who the third party is and what they might do with the information that is being provided, translated, and relayed.

SUMMARY

Instant messaging (IM) is provided and translated between parties that speak different languages, such as between a foreign language speaker and an entity. One or more converters may convert the foreign language speaker's speech to IM text in the speaker's language, which may then be translated into a language used by the entity. The foreign language speaker may provide IM text instead of speaking, and this IM text in the foreign language may be translated into IM text in a language used by the entity. The translated IM text or the speech converted from the translated IM text may then be provided as text, or may be converted to speech and provided as speech, to the entity, or a representative associated with the entity.

The converter(s) and translator(s) may also translate the response communication, such as speech or IM text, from the entity, into IM text in the language used by the foreign language speaker. This translated IM text may then be provided to the foreign language speaker, or may be converted to speech in the foreign language and provided to the foreign language speaker.

The conversation between the foreign language speaker and the representative can take place using speech from the parties that is converted to IM text and then translated, or using IM without speech, or using a combination of speech and IM, for example.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustration, there is shown in the drawings example constructions of the embodiments; however, the embodiments are not limited to the specific methods and instrumentalities disclosed. In the drawings.

DETAILED DESCRIPTION

Figure 1:
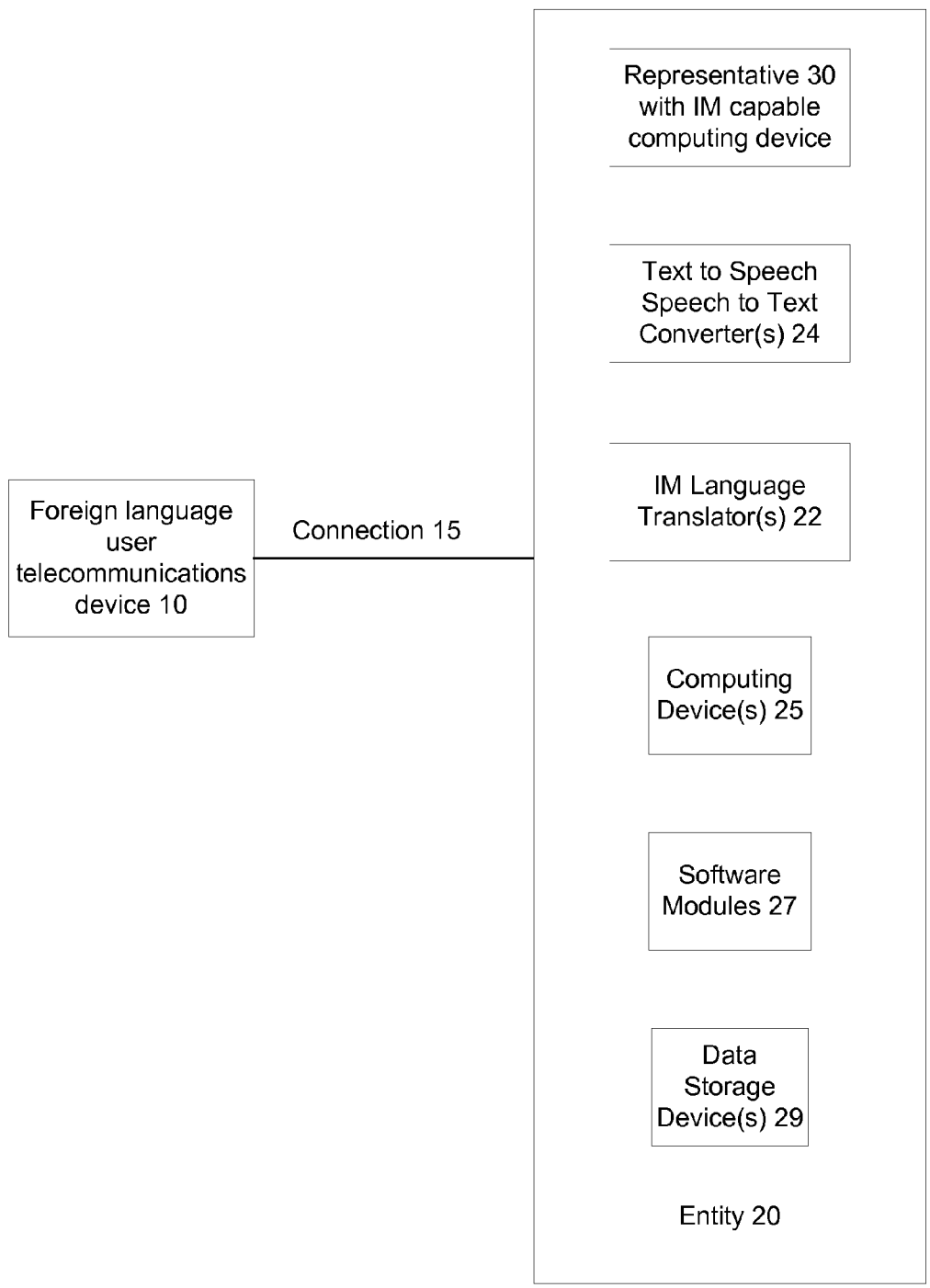
FIG. 1 is a block diagram of an implementation of a system that provides instant messaging between two parties on a phone call who speak different languages.

FIG. 1 is a block diagram of an implementation of a system that provides instant messaging (also referred to herein as IM) between two parties on a phone call who speak different languages. Instant messaging is a form of real-time communication between two or more parties based on typed text. Instant messaging uses an instant messaging client that connects to an instant messaging service. Many IM clients are known, such as Microsoft's Windows Messenger, Yahoo's Instant Messenger, and AOL's Instant Messenger.

A connection 15 is established between a foreign language user's telecommunications device 10, such as a phone or computing device, and a telecommunications device, such as a phone or computing device, associated with an entity 20. A user may use the telecommunications device 10 to initiate a call with the entity 20, or vice-versa. The telecommunications device 10 may be any known phone or computing device with telephone functionality, and in some implementations, may be capable of sending and receiving IM messages. Such devices are well known and their descriptions are omitted for brevity.

The entity 20 may be a company, such as a financial services company or bank, for example, and comprises one or more translators 22 that convert IM text from one language to another language. Languages that may be translated to and from include English, Spanish, German, French, and Russian, for example, though any language may be translated to and from, depending on the application(s) or system(s) used to perform the actual translations, described further herein.

The translator(s) 22 may translate an IM message received from the user's telecommunications device 10, or generated based on signals received from the telecommunications device 10, to an IM message in a different language, such as a language that is used or preferred by the entity 20 or a representative 30 of the entity. The translator(s) 22 may also convert IM from the representative 30 to an IM message in a different language, such as a language used by the user who is communicating with the entity 20 via the telecommunications device 10. The translation may be performed by the same translation device(s) and/or module(s) or by different translation devices and/or modules. Various IM protocols, described further herein, may be supported.

In an implementation, the entity further comprises one or more text-to-speech/speech-to-text converters 24. The converter(s) 24 may convert the instant message from the user's device, or the translated instant message based on the user's transmitted instant message, to speech that may then be provided to the representative. The converter(s) 24 may also convert the representative's speech to an instant message in the representative's language, which may then be translated to the user's language prior to being provided to the user.

Alternatively, the speech from the user or representative is directly translated into an instant message in the language that the recipient uses, and the intermediate operation of converting the speech to an instant message of the speaker's language, prior to translating into the recipient's language, may not be used. In this manner, the parties may communicate with each other by speaking and listening, without a third party translator, and the parties do not have to prepare instant messages. This provides further efficiencies, as the parties do not have to type or read IM text. The converter(s) 24 may contain a well known text-to-speech converter and a well known speech-to-text converter, where the text that is being converted to and from may be text pertaining to an instant message. The text-to-speech converter and the speech-to-text converter may be separate components, modules, or applications, for example.

In an implementation, one or more representatives 30 are associated with the entity 20, and may have one or more computing devices on which to receive and transmit IM messages. The entity 20 may also comprise one or more computing devices 25 that may operate in conjunction with software modules 27 and one or more data storage devices 29. The data storage device(s) 29 may contain user information that had been previously received and stored, e.g., with respect to a user's accounts. This data may be personal information such as the user's marital status, age, address, account information, etc., for example, and may be used to confirm the identity of the user or to personalize data pertaining to the user that is presented to the representative. An example computing device is described with respect to FIG. 7.

Software modules 27 are shown that may be used in the performance of the example techniques described herein in conjunction with the other various elements and components described herein. Example software modules include modules for maintaining a connection between a user and a representative, retrieving user and other data from storage, performing translations of instant messages, packaging information for transmission, and generating information that may be useful to the representative and the user, described further herein. While specific functionality is described herein as occurring with respect to specific modules, the functionality may likewise be performed by more, fewer, or other modules. The functionality may be distributed among more than one module.

As noted above, a connection 15 is established between the telecommunications device 10 and the entity 20. The connection 15 may comprise a telephone network, a local area network, a wide area network, the Internet, or any combination thereof, for example.

Figure 2:
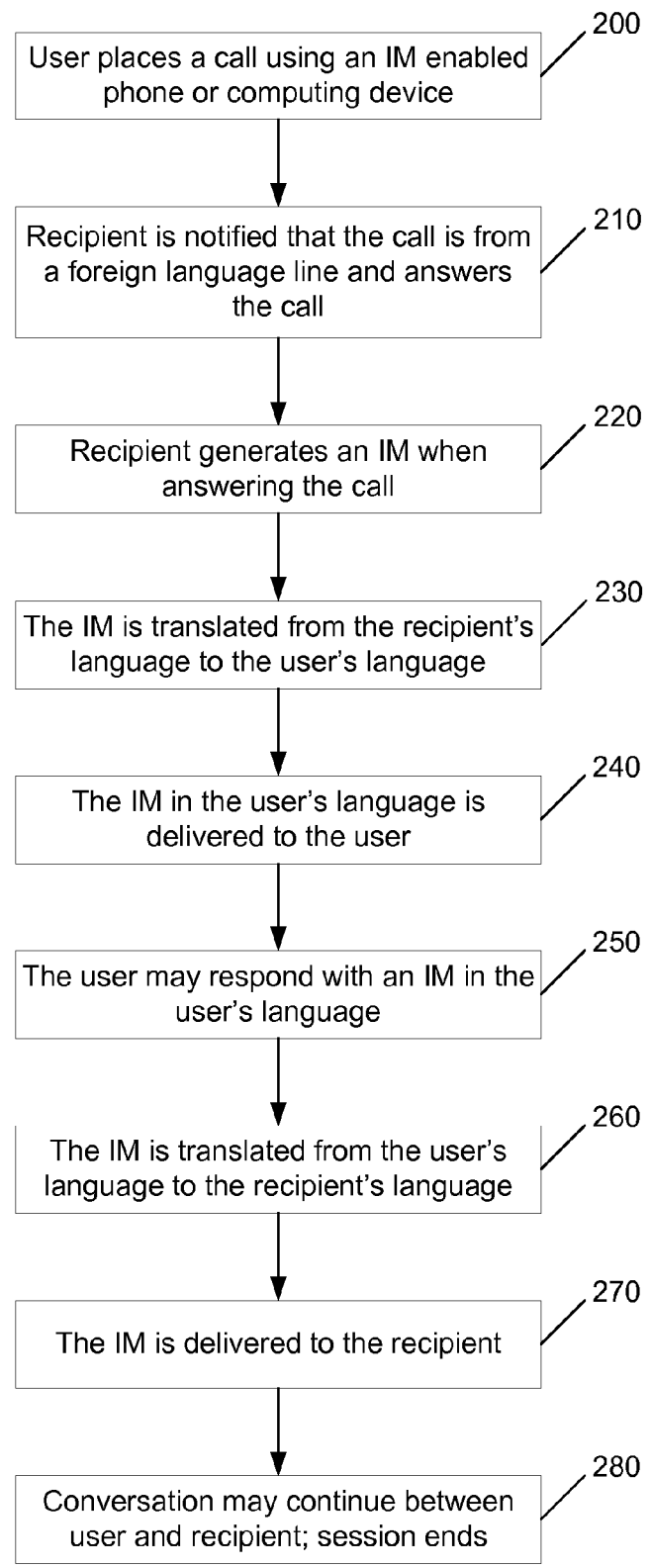
FIG. 2 is an operational flow of an implementation of a method that provides instant messaging between two parties on a phone call who speak different languages.

FIG. 2 is an operational flow of an implementation of a method that provides IM between two parties on a phone call who speak different languages. One of the parties may be an individual, such as a customer, and the other party may be a representative of an entity, such as a financial services company or a bank, for example.

At operation 200, a user may place a call through a phone or computing device, which may be IM enabled, to the entity. A recipient, such as a representative associated with the entity, may be notified both that the incoming call is from a foreign language line and what the user's language is, and may answer the call, at operation 210. There may be a separate phone number for each foreign language. The entity may know which language the incoming call is likely to be in based on which phone number has been used to make the incoming call. The notification to the representative may be in the form of a displayed window, message, or other indicator on the representative's computer monitor or display, or a notification over the representative's telephone, for example. In an implementation, a button, icon, or link, for example, is provided that the representative can select to answer the call and begin a voice or an instant messaging conversation with the user.

At operation 220, the representative may generate an instant message in answering the call. The instant message may request authentication information from the user, or may be another type of greeting, for example. Authentication of the user may involve a password, code, credential, key, etc. Authentication techniques are well known and their descriptions are omitted for brevity. The instant message may be translated from the representative's language to the user's language, at operation 230. The instant message in the user's language may then be delivered to the user, at operation 240.

The user receives an instant message, and may respond with an instant message in his language, at operation 250. The instant message sent by the user's device may be received and converted to an instant message in the representative's or other recipient's language, at operation 260, by translating the instant message from one language to another language. The instant message may then be delivered to the representative, at operation 270. In this manner, a two-way conversation may continue between the user and the representative, at operation 280, until the session ends. It is contemplated that timestamps may be used so that messages between the user and the representative do not overlap.

Thus, a user may confer with a representative or other call recipient via instant messages that are translated into the particular language of each party, whether the parties speak the same language or different languages. Because there is no need for a third-party translator, time and expense are saved, and the user's information is more secure and is maintained in greater privacy.

Figure 3:
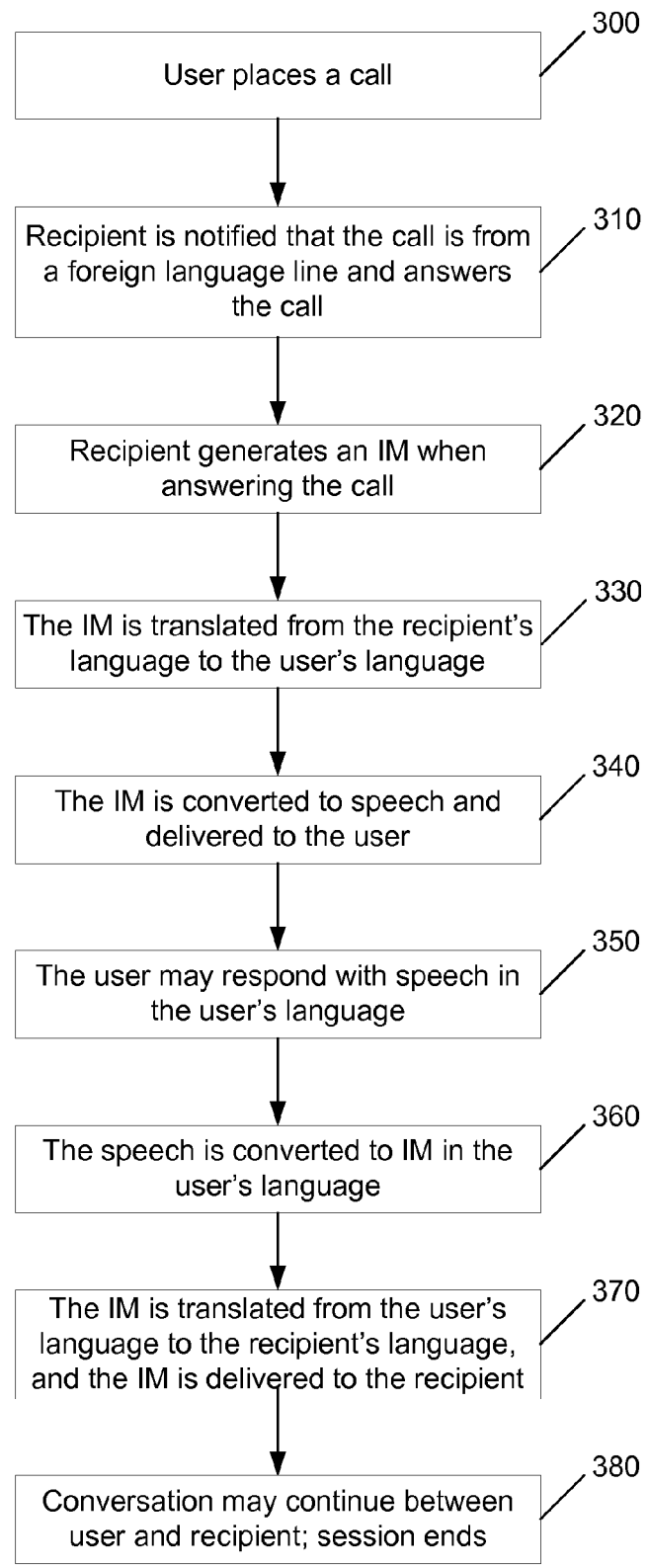
FIG. 3 is an operational flow of another implementation of a method that provides instant messaging between two parties who speak different languages.

Alternatively, the IM messages that are to be delivered to the user are converted to speech and then delivered to the user. In this manner, the user does not have to type and read instant messages, and therefore does not need to use an IM-enabled phone or computing device. FIG. 3 is an operational flow of another implementation of a method that provides instant messaging between two parties who speak different languages.

At operation 300, a user may place a call to an entity. As in the implementation of FIG. 2, a representative associated with the entity may be notified both that the incoming call is from a foreign language line and what the user's language is, and may answer the call, at operation 310. At operation 320, the representative may generate an instant message in answering the call, and the instant message may be translated from the representative's language to the user's language, at operation 330.

At operation 340, the instant message in the user's language is converted to speech, which may then be delivered to the user. Alternatively, the instant message in the representative's language may be directly translated and converted to speech in the user's language, bypassing the operation of generating an instant message in the user's language based on the instant message in the representative's language.

The user receives the instant message verbally, in the user's language, and may respond with speech in his language, at operation 350. The speech may be converted to an instant message in the user's language at operation 360, and then translated to an instant message in the representative's language at operation 370. Alternatively, the speech may be converted directly to an instant message in the representative's language without first converting the speech to an instant message in the user's language.

The instant message may then be delivered to the representative. In this manner, a two-way conversation may continue between the user and the representative, at operation 380, until the session ends. As with the implementation of FIG. 2, timestamps may be used so that messages between the user and the representative do not overlap.

Figure 4:
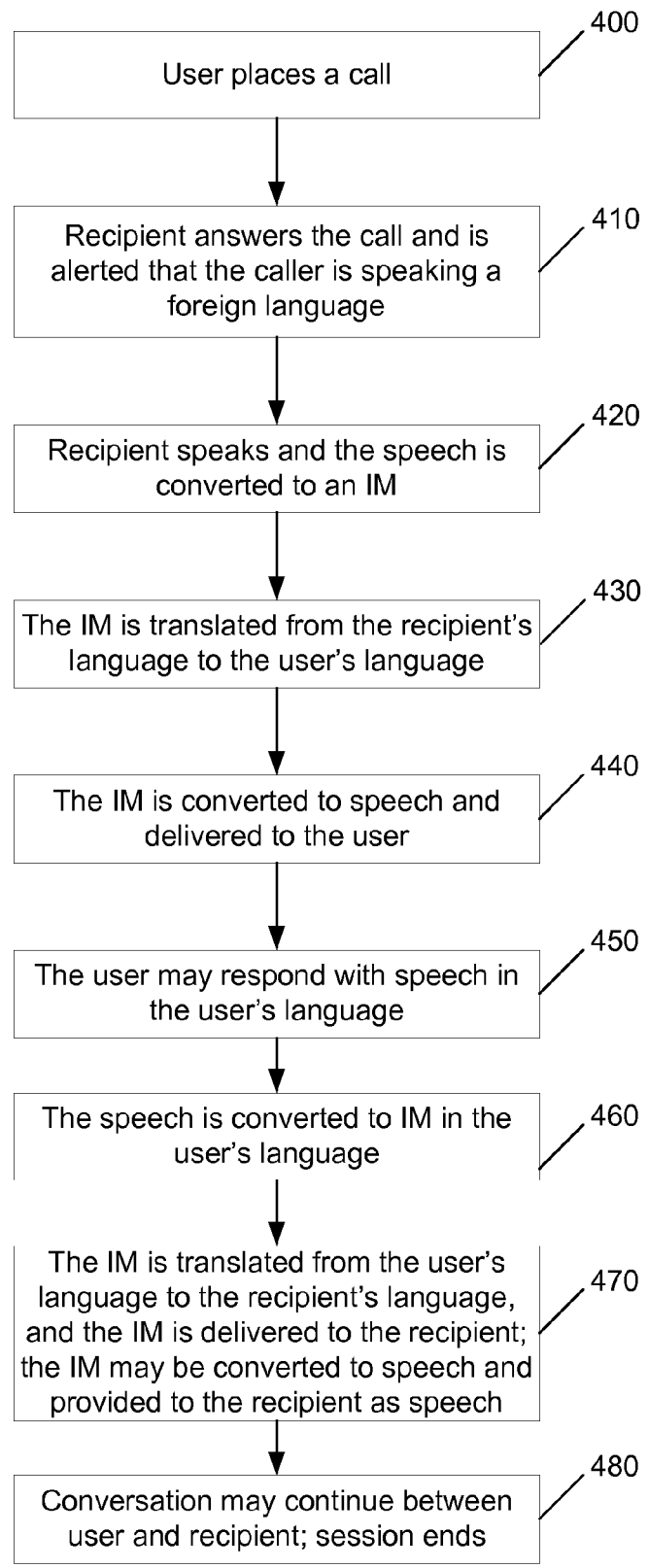
FIG. 4 is an operational flow of another implementation of a method that provides instant messaging between two parties who speak different languages.

Alternatively, instant messages from a user may be converted to speech that is provided to a representative, and/or the representative may speak in response, and this speech is converted to IM, which may then be translated and provided to the user in the user's language, either as instant messages or as speech. FIG. 4 is an operational flow of another implementation of a method that provides IM between two parties who speak different languages.

The implementation of FIG. 4 may be similar to that described above with respect to FIG. 3, and includes both the conversion of IM text to speech prior to delivery to the recipient of the call, and conversion of the recipient's speech to IM text, which may then be translated and provided to the user. In an implementation, the recipient may be a representative of an entity, such as a financial services company or a bank, for example.

At operation 400, a user may place a call to an entity, and at operation 410, a recipient, such as a representative of the entity, answers the call and is alerted that the user is speaking a different language. At operation 420, the representative may speak and the speech is converted to an instant message.

Operations 430 to 460 are similar to operations 330 to 360, described with respect to FIG. 3. The instant message may be translated from the representative's language to the user's language at operation 430, and the instant message in the user's language may be converted to speech at operation 440, which may then be delivered to the user. Alternatively, the instant message in the representative's language may be directly translated and converted to speech in the user's language, bypassing the operation of generating an instant message in the user's language based on the instant message in the representative's language.

The user may receive the instant message verbally, in the user's language, and may respond with speech in his language, at operation 450. The speech may be converted to an instant message in the user's language at operation 460, and may then be translated to an instant message in the representative's language, converted to speech, and delivered, at operation 470. Alternatively, the speech may be converted directly to an instant message in the representative's language without first converting the speech to an instant message in the user's language.

Thus, a spoken message is provided to the representative, so that a two-way spoken conversation may continue between the user and the representative, at operation 480, until the session ends. Thus, neither party has to generate an instant message, though instant messages may be generated and utilized in response to the parties' spoken messages.

Figure 5:
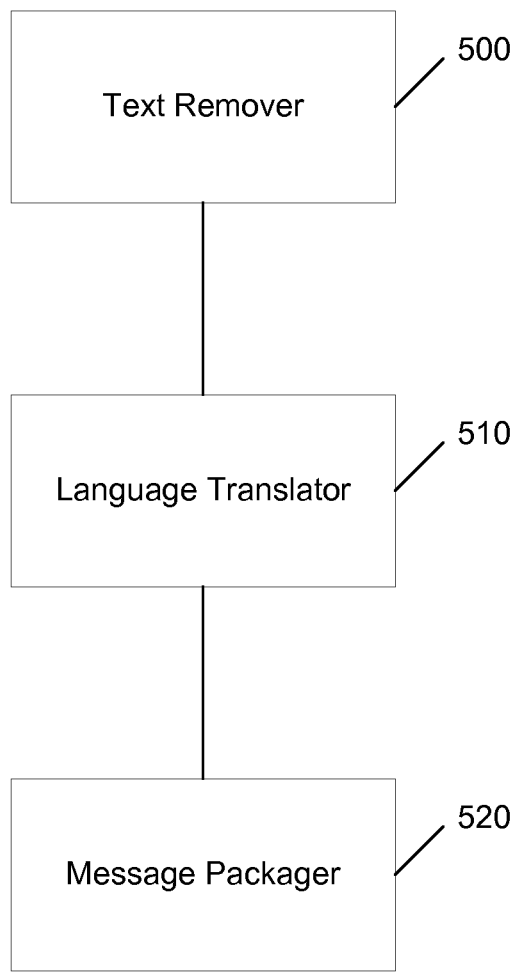
FIG. 5 is a block diagram of an implementation of an instant messaging language translator.

FIG. 5 is a block diagram of an implementation of an instant messaging language translator that may be used to translate an instant message from one language to another language. It is contemplated that any instant messaging protocol, such as Windows messaging, ICQ, Internet Relay Chat (IRC), etc., may be used. For example, IRC is a form of real-time Internet chat or synchronous conferencing. It may be used for group (many-to-many) communication in discussion forums called channels, and also allows one-to-one communication and data transfers via private messages. IRC is an open protocol that uses transmission control protocol (TCP), a protocol developed for the Internet to move data from one network device to another, and may also use secure sockets layer (SSL), a security protocol for transactions on the Internet, that uses public-key cryptography to provide server authentication, data encryption, and data integrity.

A text remover 500 strips the text and other information (e.g., identifier, header, etc.) from the instant message. A language translator 510 translates the stripped text to a desired language. Any language translation application or system that translates text from one language to another language may be used. A message packager 520 packages the translated text into an appropriate instant message package for delivery, e.g., via an Internet chat system.

Figure 6:
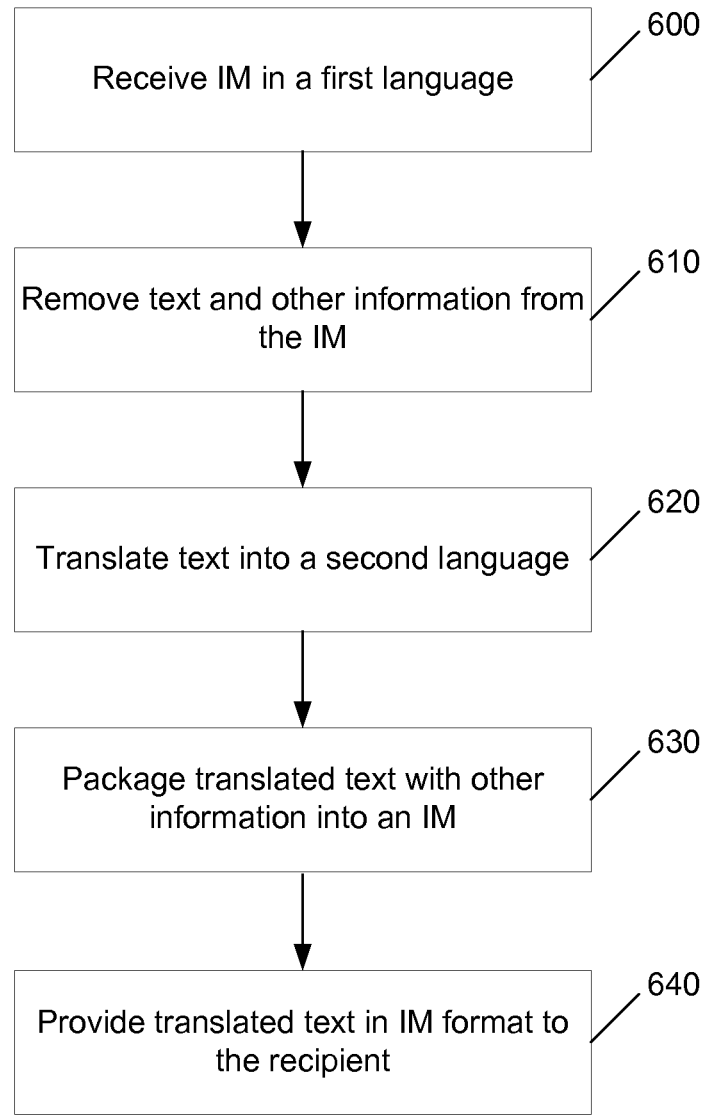
FIG. 6 is an operational flow of an implementation of an instant messaging language translation method.

FIG. 6 is an operational flow of an implementation of an IM language translation method. An instant message in a first language is received at operation 600, and the text and other information are stripped from it at operation 610. The text is translated into a second language at operation 620, and is packaged with the other information into an instant message at operation 630. The translated instant message is then transmitted or otherwise provided to the appropriate party at operation 640.

It is contemplated that each of the parties to a call may be a person or an automated system involving computers, phones, or both. It is also contemplated that the call recipient described herein may initiate the call (e.g., the representative of the entity initiates the call). In such an implementation, the representative's call may be initiated as an IM or speech converted to IM, translated into the language appropriate for the user, and delivered to the user who would be the call recipient.

Exemplary Computing Arrangement

Figure 7:
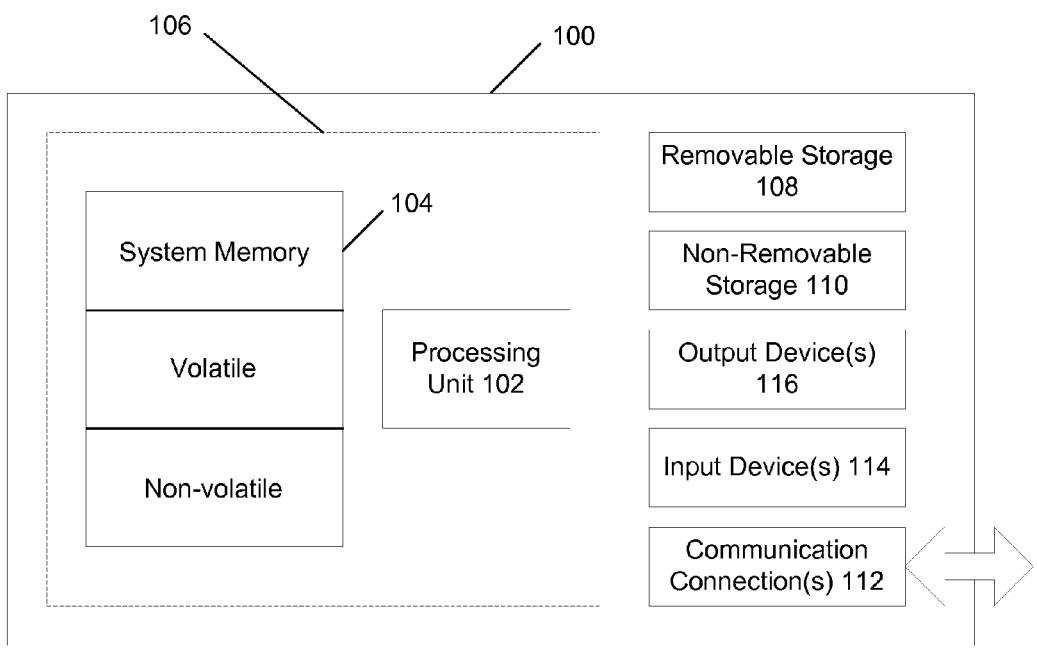
FIG. 7 is a block diagram of an example computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 7 by dashed line 106.

Computing device 100 may have additional features/functionality. For example, computing device 100 may include additional storage (removable and/or non-removable) including, but not limited to, magnetic or optical disks or tape. Such additional storage is illustrated in FIG. 7 by removable storage 108 and non-removable storage 110.

Computing device 100 typically includes a variety of computer-readable media. Computer-readable media can be any available media that can be accessed by computing device 100 and include both volatile and non-volatile media, and removable and non-removable media. By way of example and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media include, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communications connection(s) 112 that allow the device to communicate with other devices. Communications connection(s) 112 is an example of communication media. Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, radio-frequency (RF), infrared and other wireless media. The term computer-readable media as used herein includes both storage media and communication media.

Computing device 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-readable medium having computer-readable instructions for providing two-way communication, the computer-readable instructions comprising instructions stored thereon that are executed by a processor to:

receive a notification that an incoming communication is from a foreign language line and of a first language of the incoming communication, wherein the notification is not based on previously stored user information and wherein the notification is in the form of one or more of a displayed window, message, or other indicator on a computer or over a telephone;

receive a selection at a second telecommunications device indicating whether to proceed communicating with a first telecommunications device based on the notification;

receive speech in the first language from the first telecommunications device;

receive personal information from the first telecommunications device, wherein the personal information includes user account information comprising marital status, age, and address;

request authentication information for the incoming communication, wherein the authentication is based on the received personal information and personal information previously received and stored;

convert, by a financial services company, the speech in a first language to an instant messaging (IM) message in a second language without generating an IM message in the first language;

provide the converted IM message to a second telecommunications device, wherein the converted IM message comprises a timestamp; and provide the received personal information to the second telecommunications device, wherein the received personal information is used to confirm an identity of a foreign language speaker and to personalize data pertaining to the user that is presented to the second telecommunications device.

2. The computer-readable medium of claim 1, wherein the first telecommunications device is associated with the foreign language speaker and the second telecommunications device is associated with an entity, and further comprising instructions that establish a connection between the first telecommunications device and the second telecommunications device.

3. The computer-readable medium of claim 2, wherein the instructions that establish the connection between the first telecommunications device and the second telecommunications device comprise instructions that:
   receive a phone call initiated by the first telecommunications device;
   provide an indication to the entity that the phone call is from the foreign language speaker; and
   respond to the indication.

4. The computer-readable medium of claim 3, wherein the instructions that respond to the indication comprise instructions that select a button, an icon, or a link displayed on a display device and generate an answer IM message.

5. The computer-readable medium of claim 1, further comprising instructions that:
   generate speech in the second language using the second telecommunications device;
   translate the speech from the second language to the first language resulting in a translated IM message; and
   send the translated IM message to the first telecommunications device.

6. The computer-readable medium of claim 1, wherein the instructions to convert the speech include instructions to translate the language using an instant message protocol of the group consisting of: Windows Messaging, ICQ, and Internet Relay Chat.

7. A non-transitory computer-readable medium having computer-readable instructions for providing communication, the computer-readable instructions comprising instructions stored thereon that are executed by a processor to:
   establish a connection between a first telecommunications device and a second telecommunications device;
   generate a notification at the second telecommunications device that incoming communication is from a foreign language line and indicate a first language of the incoming communication, wherein the notification is not based on previously stored user information and wherein the notification is in the form of one or more of a displayed window, message, or other indicator on a computer or over a telephone;
   request a selection at the second telecommunications device indicating whether to proceed communicating with the first telecommunications device based on the notification;
   receive personal information from the first telecommunications device, wherein the personal information includes user account information comprising marital status, age, and address;
   process authentication information received from the first telecommunications device, wherein the authentication information includes the user account information;
   generate an instant messaging (IM) message in a first language at a first device, wherein the IM message comprises a timestamp;
   strip the IM message text from the instant message using a text remover;
   convert the stripped information from the IM message to speech in a second language without generating an IM message in a second language;
   deliver the IM message that has been converted to speech to a second device; and
   deliver the personal information to the second device, wherein the personal information is used to confirm an identity of a foreign language speaker.

8. The computer-readable medium of claim 7, further comprising instructions that provide the speech to the second telecommunications device.

9. The computer-readable medium of claim 7, wherein the second telecommunications device is associated with a financial services company.

10. The computer-readable medium of claim 7, wherein the instructions that establish the connection between the first telecommunications device and the second telecommunications device comprise instructions that:
    receive a phone call initiated by the first telecommunications device;
    provide an indication to the second telecommunications device that the phone call is from the foreign language speaker; and
    answer the phone call responsive to the indication.

11. The computer-readable medium of claim 10, wherein the instructions that answer the phone call comprise instructions that:
    receive speech in the second language from a user associated with the second telecommunications device;
    convert the speech to an answer IM message in the first language; and
    send the answer IM message in the first language to the first telecommunications device.

12. A non-transitory computer-readable medium having computer-readable instructions, the computer readable instructions comprising instructions stored thereon that are executed by a processor to:
    receive a notification that incoming communication is from a foreign language line and of a first language of the incoming communication, wherein the notification is not based on previously stored user information and wherein the notification is in the form of one or more of a displayed window, message, or other indicator on a computer or over a telephone;
    request a selection at a second telecommunications device indicating whether to proceed communicating with a first telecommunications device based on the notification;
    request authentication information for the incoming communication, wherein the authentication information includes the user account information comprising marital status, age, and address;
    authenticate the received user account information provided before proceeding, wherein the authentication is based on the received user account information and user account information previously received and stored;
    receive speech in a first language from the first telecommunications device;
convert the speech to an instant messaging (IM) message in a second language without generating an IM message in the first language;
    strip the IM message in the second language text from the instant message using a text remover;
    convert the stripped text from the IM message in the second language to speech;

deliver the IM message that has been converted to speech to a second device using a plurality of computer automated operations, wherein the delivered IM message comprises a timestamp;

receive personal information from the first telecommunications device wherein the personal information includes one or more of the following: marital status, age, address; and deliver the personal information to the second device, wherein personal information is used to confirm an identity of a first person.

13. The computer-readable medium of claim 12, wherein the instructions that convert the speech to the IM message in the second language and convert the IM message in a second language to speech using the computer automated operations permit the first person and a second person to communicate without a human translator.

14. The computer-readable medium of claim 12, wherein the instructions that convert the speech comprise instructions that convert speech received in the first language to the IM message in the first language without generating the IM message in the second language and convert the IM message in the first language to speech in the second language.

\* \* \* \* \*